United States Patent
Nishizawa et al.

(10) Patent No.: US 12,161,061 B2
(45) Date of Patent: Dec. 10, 2024

(54) ELECTRIC VEHICLE

(71) Applicant: Kanzaki Kokyukoki Mfg. Co., Ltd., Hyogo (JP)

(72) Inventors: Takashi Nishizawa, Hyogo (JP); Kohei Ogura, Hyogo (JP); Masato Arata, Hyogo (JP); Daisuke Kono, Hyogo (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 346 days.

(21) Appl. No.: 17/674,322

(22) Filed: Feb. 17, 2022

(65) Prior Publication Data

US 2022/0256766 A1    Aug. 18, 2022

(30) Foreign Application Priority Data

Feb. 18, 2021 (JP) .................................. 2021-24600

(51) Int. Cl.
| | |
|---|---|
| *A01D 34/64* | (2006.01) |
| *A01D 34/78* | (2006.01) |
| *B60K 1/04* | (2019.01) |
| A01D 101/00 | (2006.01) |

(52) U.S. Cl.
CPC ............ *A01D 34/64* (2013.01); *A01D 34/78* (2013.01); *B60K 1/04* (2013.01); *A01D 2101/00* (2013.01); *B60K 2001/0422* (2013.01)

(58) Field of Classification Search
CPC .......................... A01D 34/78; A01D 2101/00
See application file for complete search history.

(56) References Cited

U.S. PATENT DOCUMENTS

| | | | | |
|---|---|---|---|---|
| 11,485,212 | B2* | 11/2022 | Ito ........................ | B60R 16/0207 |
| 11,489,226 | B2* | 11/2022 | Yamada ................. | B60L 53/80 |
| 11,667,181 | B2* | 6/2023 | Fan ........................ | A01D 34/64 |
| | | | | 180/68.5 |
| 2008/0264026 | A1 | 10/2008 | Ishii et al. | |
| 2016/0183451 | A1* | 6/2016 | Conrad ................. | A01D 34/66 |
| | | | | 56/10.2 R |
| 2017/0136864 | A1* | 5/2017 | Ito ..................... | H01M 10/6563 |
| 2018/0303027 | A1 | 10/2018 | Koike et al. | |
| 2021/0170852 | A1* | 6/2021 | Fan ........................ | A01D 34/78 |
| 2022/0379704 | A1* | 12/2022 | Tottori ..................... | B60K 1/04 |

FOREIGN PATENT DOCUMENTS

| | | |
|---|---|---|
| CN | 110771352 A | 2/2020 |
| JP | 2018184035 A | 11/2018 |

OTHER PUBLICATIONS

EPO Extended European Search Report for EP Application No. 22157082.3; Issued on Jul. 14, 2022.

* cited by examiner

Primary Examiner — Brian L Swenson
(74) Attorney, Agent, or Firm — CANTOR COLBURN LLP

(57) ABSTRACT

An electric vehicle includes a body frame, a seat disposed on the body frame, a wheel attached to the body frame to be driven by an electric motor, a battery to supply electric power to the electric motor via an inverter and an electrical component, a plate member placed inside a covered space with a top being covered and on which the inverter and the electrical component are mounted, and a guide supported by the body frame to drawably guide the plate member from a position inside the covered space to a position outside the covered space.

8 Claims, 15 Drawing Sheets

ELECTRIC VEHICLE

CROSS REFERENCE TO RELATED APPLICATIONS

The present invention claims priority under 35 U.S.C. § 119 to Japanese Patent Application No. 2021-24600 filed on Feb. 18, 2021, the entire contents of which being incorporated herein by reference.

BACKGROUND

Technical Field

The present disclosure relates to an electric vehicle.

Related Art

Conventionally, there have been known vehicles such as lawn mowing vehicles equipped with lawn mower blades, in which the wheels can be driven by an electric motor to travel, and the lawn mower blade is driven by another electric motor to work. JP 2018-184035 A discloses a lawn mowing vehicle (electric vehicle) in which left and right wheels can be driven by left and right electric motors, respectively. The vehicle has a storage box which is attachable to and detachable from a vehicle body by bolts. The storage box contains electrical components such as inverters, converters, main relays, and various types of fuses.

In the electric vehicles in which inverters and electrical components to supply power to a battery are installed on a body frame of the vehicle body, if the inverters and electrical components are exposed to an external environment in a normal condition, rainwater and dust may lead to deterioration of the components and electrical shock and degrade the appearance when in use. On the other hand, in the electric vehicles in which components such as inverters and electrical components are placed in a space whose upper side is covered by a vehicle seat and the like in order to protect the components from splashing rainwater, it is necessary to remove the vehicle seat and the like covering the upper side of the components from the vehicle body when performing maintenance or repairs. Furthermore, even when the vehicle seat and the like are removed, other parts are placed in the vicinity of the components in a small space, which results in difficulty of performing maintenance or repairs, and thus there is a need to improve workability.

JP 2018-184035 A discloses that electrical components such as inverters and the like are accommodated in a storage box that is attachable to and detachable from the vehicle body under the seat. Although this may protect the electrical components from splashing rainwater, when performing repairs or maintenance, it is necessary to remove a heavy storage box from the vehicle body after the seat is separated therefrom, and thus there is a need to improve workability.

SUMMARY

An object of the present disclosure is to provide an electric vehicle capable of protecting inverters and electrical components from splashing rainwater, improving the appearance of the electric vehicle when in use, and improving the workability of repairs and maintenance.

According to an aspect of the present disclosure, an electric vehicle is provided, which includes: a body frame; a seat disposed on the body frame; a wheel attached to the body frame to be driven by an electric motor; a battery to supply electric power to the electric motor via an inverter and an electrical component; a plate member placed inside a covered space with a top being covered and on which the inverter and the electrical component are mounted; and a guide supported by the body frame to drawably guide the plate member from a position inside the covered space to a position outside the covered space.

BRIEF DESCRIPTION OF THE DRAWINGS

Embodiment(s) of the present disclosure will be described based on the following figures, wherein.

DESCRIPTION OF EXEMPLARY EMBODIMENTS

Figure 1A:
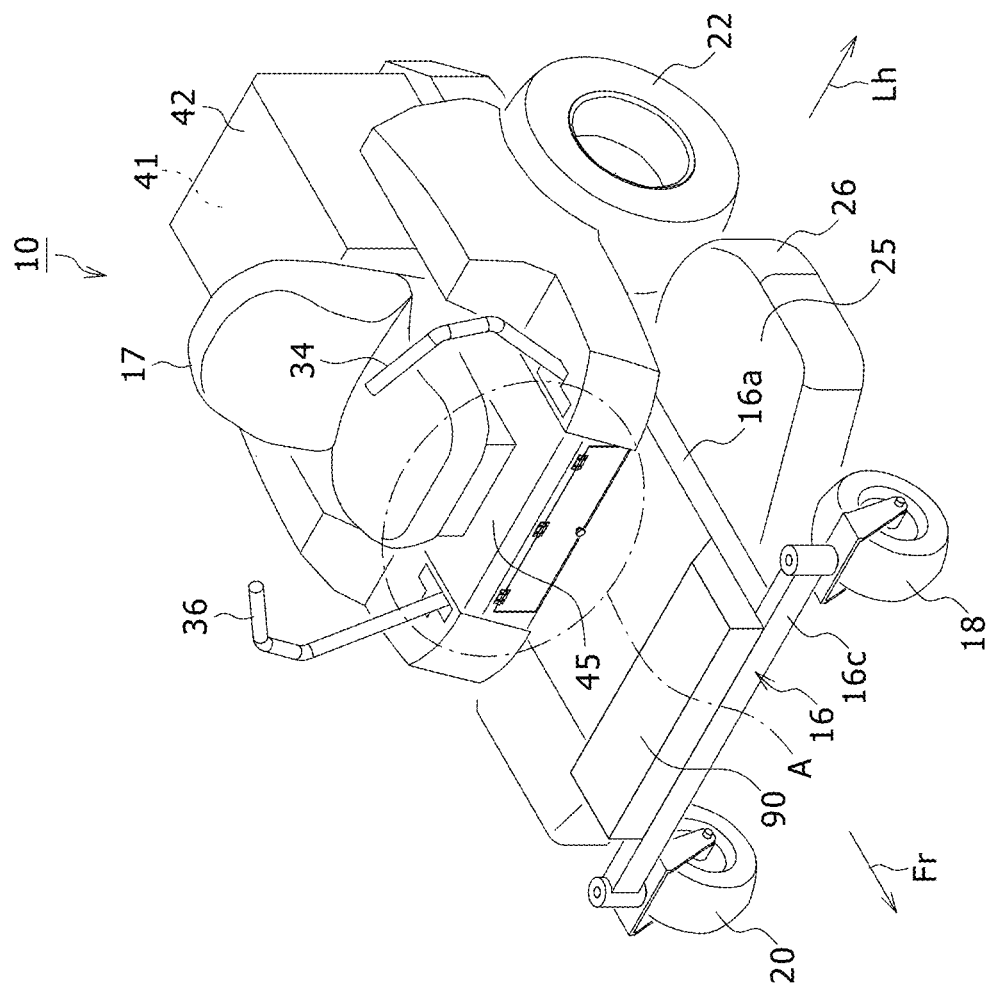
FIG. 1A is a perspective view of an electric vehicle according to an embodiment of the present disclosure.

Now some embodiments of the present disclosure will be described below in detail with reference to the drawings. In the following, an electric vehicle is described as a lawn mowing vehicle, but the electric vehicle of the present disclosure is not limited thereto, and may be a work vehicle equipped with a work machine capable of performing at least one task, such as snow removal, excavation, civil engineering, or agricultural work, or an off-road type utility vehicle having a cargo bed and traveling on uneven terrain, or an all-terrain vehicle (ATV) called a buggy, or a Recreational Vehicle (RV), or a Recreational Off-highway Vehicle (ROV). In the following, the electric vehicle, in which two rear wheels are driven with two motors, respectively, is described as an example, but it may be configured so that the two rear wheels are driven with a single motor. The electric vehicle may also be configured so that two front wheels are driven with a single motor or twin motors. Also in the following, a left-right lever-type operator with left and right operation levers is described as only an example, but the present disclosure is not limited thereto; a steering handle may be used as a steering controller, and an accelerator pedal provided in front of a seat may be used as an acceleration controller. In the following description, the same elements are denoted by identical reference numerals throughout all the drawings.

First Embodiment

Figure 1B:
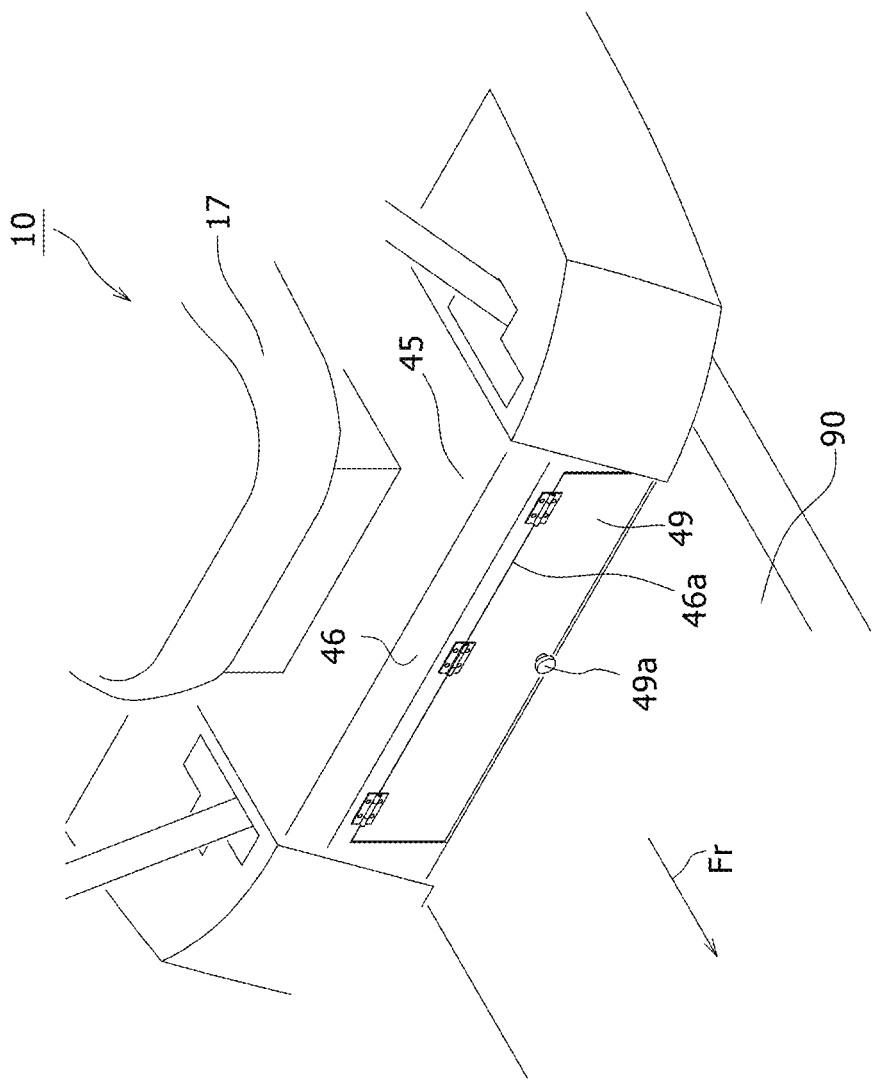
FIG. 1B is a partially enlarged diagram illustrating an area A of FIG. 1A.
Figure 2:
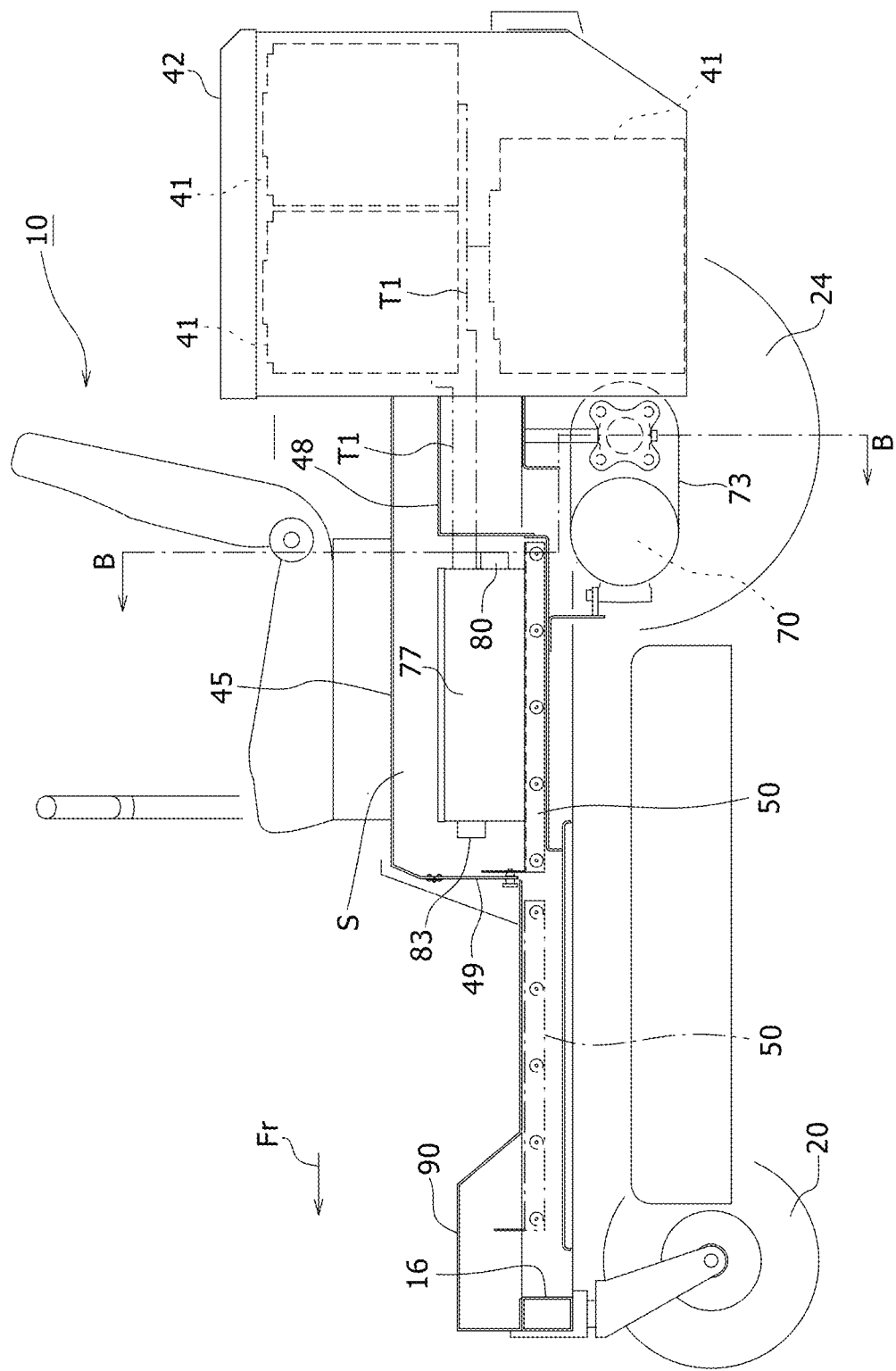
FIG. 2 is a side view of the electric vehicle shown in FIG. 1A in which a portion of the electric vehicle is illustrated as a cross sectional view.
Figure 3:
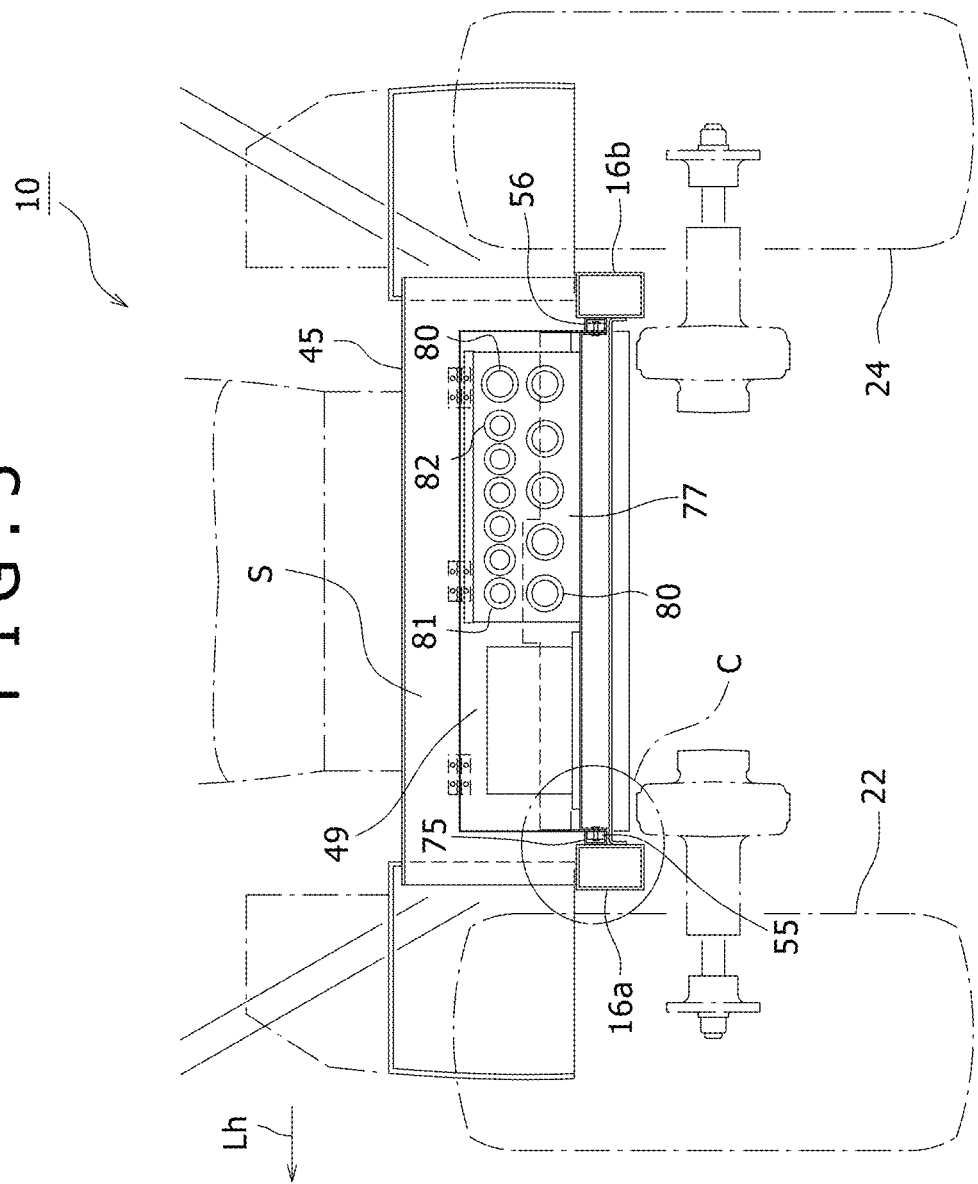
FIG. 3 is a cross sectional view taken along line B-B of FIG. 2.
Figure 4:
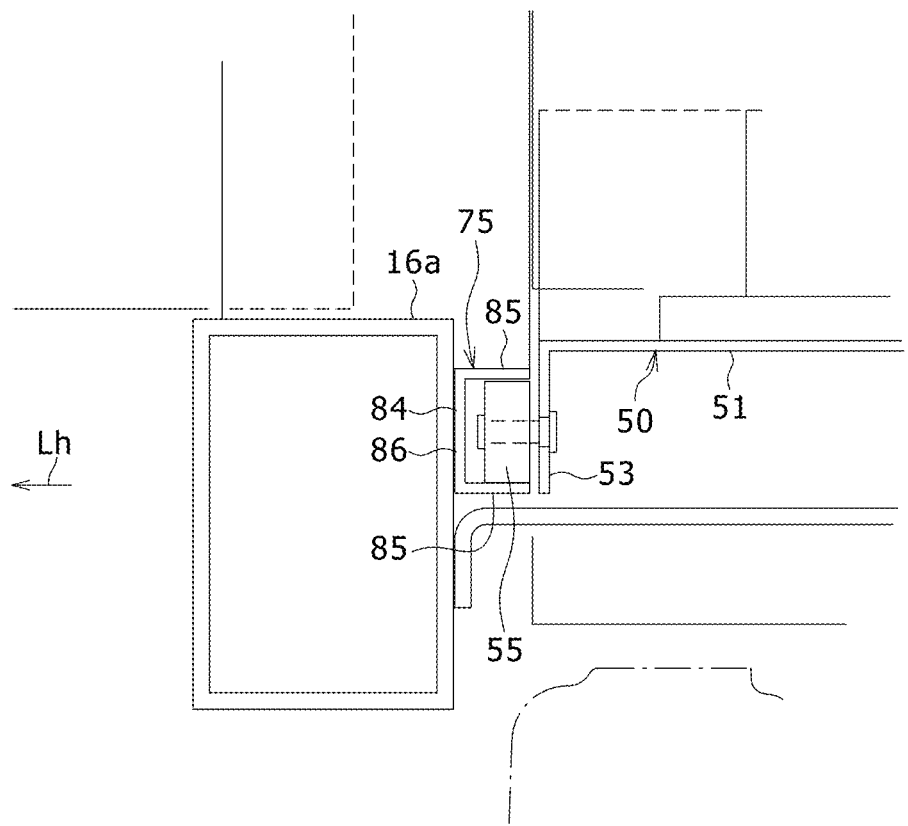
FIG. 4 is a partially enlarged diagram illustrating an area C of FIG. 3.

FIG. 1A through FIG. 10 show a first embodiment. FIG. 1A is a perspective view of an electric vehicle 10 according to the embodiment. FIG. 1B is a partially enlarged diagram illustrating an area A of FIG. 1A. FIG. 2 is a side view of the electric vehicle 10 shown in FIG. 1A in which a portion of the electric vehicle is illustrated as a cross sectional view. FIG. 3 is a cross sectional view taken along line B-B of FIG. 2, and FIG. 4 is a partially enlarged diagram illustrating an area C of FIG. 3. In the drawings described below, a side indicated by Fr is defined as the front side, and a side indicated by Lh is defined as the left side.

The electric vehicle 10 is of the riding type that a driver sifting in a seat 17 can drive, and includes a body frame 16, two caster wheels 18, 20 of left and right front wheels, two wheels 22, 24 of left and right rear wheels (see FIG. 3), a lawn mower 25 of a work machine, and two operation levers 34, 36 of right-and left levers.

Figure 6:
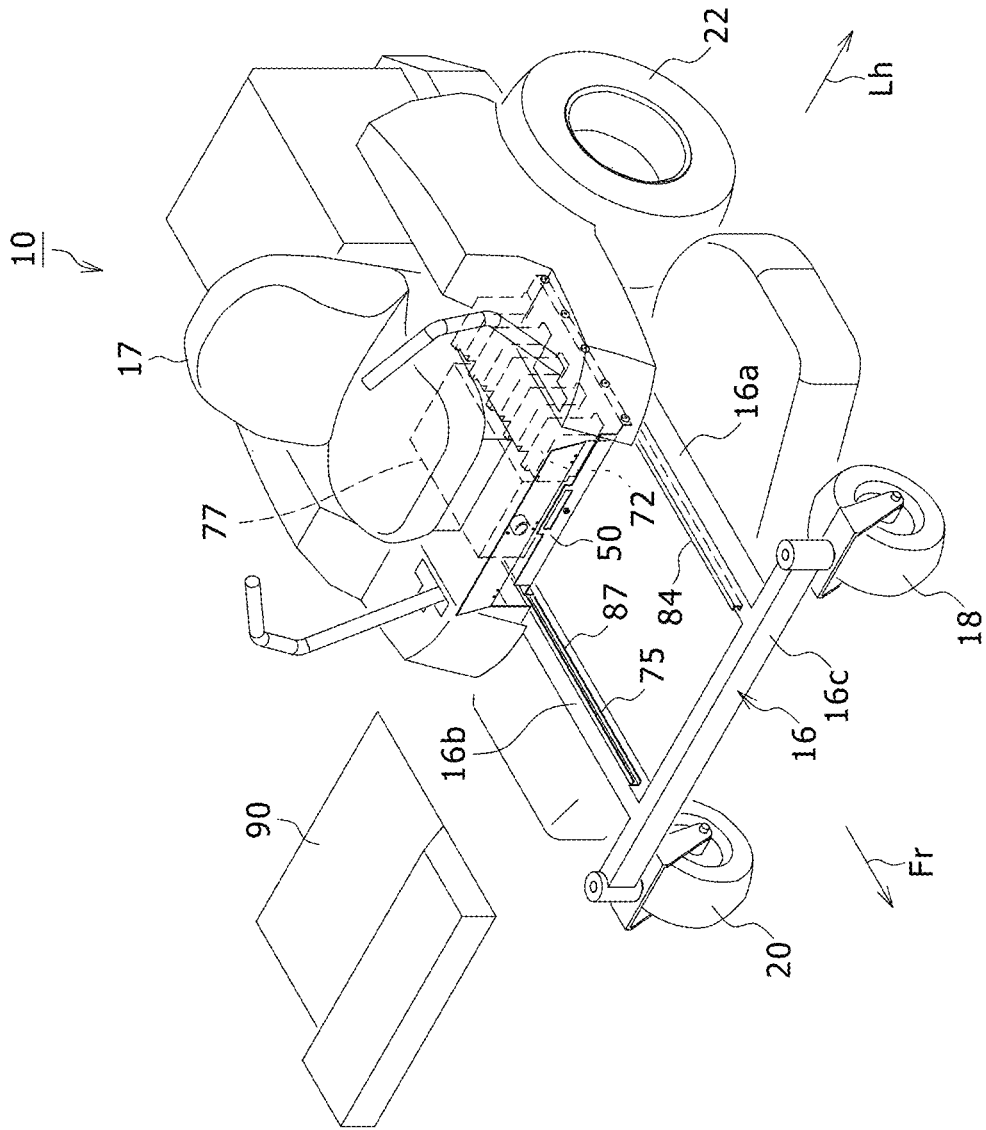
FIG. 6 is a perspective view of the electric vehicle in FIG. 5 with a front cover being removed.

As shown in FIG. 1A and FIG. 6 referred to later, the body frame 16 is formed by coupling a plurality of lateral frames 16c extending in a lateral direction to two main frames 16a and 16b extending in a front-and-rear direction on the right and left sides. In FIG. 1 and FIG. 6, only one of the plurality of lateral frames 16c, which is provided at the front end of the vehicle, is shown. The seat 17 is positioned and fixed on the upper side of the middle portion in the front-and-rear direction of the body frame 16. The left and right caster wheels 18, 20 are supported on the front side from a front end of the body frame 16. As each of caster wheels 18, 20 is rotatable freely more than 360 degrees around a vertical axis. The left and right wheels 22, 24 are rotatably attached on the rear side of the body frame 16. The left and right wheels 22, 24 are main drive wheels and are driven by left and right electric motors 70 for traveling, respectively (see FIG. 2). A plurality of batteries 41 supply electric power to the electric motors 70 through electrical components 71 and inverters 72 (see FIG. 8). The electrical component 71 includes a plurality of contactors, bus bars and fuses. In this disclosure, it is assumed that the inverter 72 is a component different from the electrical components 71. The plurality of batteries 41 are electrically connected to each other in parallel or in series. For example, one side electrode of the plurality of batteries 41 is connected to the first bus bar via a fuse, and the first bus bar is connected to the second bus bar via a plurality of contactors. The second bus bar is connected to a plurality of electric motors 70 including the left and right electric motors 70 via a plurality of the inverters 72.

The plurality of batteries 41 are fixed on the upper side of the body frame 16 and on the rear side of the seat 17 of the electric vehicle 10 and are covered by a battery cover 42. In this example, as shown in FIG. 2, the number of the plurality of batteries 41 is three, with two batteries 41 being disposed on the upper side and one battery 41 being disposed on the lower side. A partition (not shown) is provided between the upper side and lower side batteries 41 inside the battery cover 42. The two upper side batteries 41 are arranged side by side so that the longitudinal direction of each battery is aligned with the right-and-left direction. The one lower side battery 41 is positioned at the center in the right-and-left direction of the battery cover 42 so that a longitudinal direction of the battery is aligned with the front-and-rear direction. Thereby, it is possible to prevent interference between the lower side battery 41 and a gear case 73 which is located in the vicinity of the inner sides of the left and right wheels 22, 24 and accommodates the gears for transmitting a driving power of the electric motor 70 to the wheels 22, 24. In addition, it is not necessary to increase the length of the electric vehicle 10 in the front-and-rear direction excessively in order to prevent such interference.

The inverters 72 convert DC power supplied from the batteries 41 into AC power and output it to the electric motors 70. Only one battery 41 may supply electric power to the electric motors 70 through the electrical components 71 and the inverters 72.

Instead of the two caster wheels 18, 20, only one caster wheel or three or more caster wheels may be attached to the electric vehicle 10, for example. The caster wheels and the wheels of the driving wheels may be replaced in the front-and-rear direction.

The lawn mower 25 is supported under the body frame 16 at the middle of the body frame 16 in the front and rear direction. The lawn mower 25 includes a mower deck 26 and three lawn mower blades (not shown) as a mowing rotary tool, each of which is rotatable around a vertical axis inside the mower deck 26. The rotation of the lawn mower blades makes it possible to break up and mow grass, etc. Each of the lawn mower blades is driven by an electric motor for the mower (not shown).

The rotation of the lawn mower blade makes it possible to mow the lawn, and the mowed grass is discharged from the inside of the mower deck 26 to the outside in the left-and right direction.

The lawn mower may be configured to comprise a lawn mowing reel as a rotary tool for mowing the lawn, which has a spiral blade, for example, arranged on a cylinder with a rotation axis parallel to a ground surface, functions to pinch and mow the grass or the like, and is driven by a deck motor.

The left and right operation levers 34 and 36 are provided on respective sides of the seat 17 to be able to pivot around a horizontal axis which is aligned with the right-and-left direction and swing toward the front-and-rear direction. When each of the operation levers 34, 36 is in a normally upright state, the electric motor 70 for traveling stops rotating. When each of the operation levers is operated to swing, instructions are issued such that a direction and speed of rotation of the electric motor 70 on the corresponding side are to be changed according to a direction and amount of swinging.

The swinging position of the operation levers 34, 36 in the front-and-rear direction is detected with a lever sensor (not shown). The detection signal of the lever sensor is input to the control unit (not shown) installed in the vehicle as a signal indicating a rotation instruction of the electric motor 70, and the control unit rotates the electric motor 70 in a direction following the instruction. The driving power of each of the electric motors 70 is transmitted to the left and right wheels 22, 24 through gears and the like. This allows the vehicle to travel in the front-and-rear direction depending on the operation of the operation levers 34, 36. In addition, a difference in a rotation speed between the left and right wheels 22, 24 is caused by varying an amount of a swinging operation between the left and right operation levers 34, 36, so that the vehicle can turn. Furthermore, by tilting one of the two operation levers 34, 36 to the front side and the other to the rear side, the left and right wheels 22, 24 rotate in opposite directions, so that the turning radius decreases to cause the vehicle to turn quickly.

As described above, in the electric vehicle 10, electric power is supplied from the batteries 41 to the electric motors 70 through the electrical components 71 and the inverters 72 in order to drive the electric motors 70. At this time, in order to protect the electrical components 71 and the inverters 72 from splashing rainwater and falling dust, as well as suppress degradation of the appearance, fixing the electrical components 71 and the inverters 72 under the seat 17 may be conceived of. However, in a configuration where the electrical components and the inverters are simply placed under the seat, it is necessary to remove the seat from the electric vehicle when the electrical components and the inverters need to be repaired or maintained. Furthermore, even when the seat is removed, since other parts are placed in the vicinity of the electrical components and the inverters in a small space, performing maintenance or repairs becomes difficult, and thus there is a need to improve workability. In the electric vehicle 10 of this example, in order to eliminate such inconveniences, the inverters 72 and the electrical components 71 are mounted on a plate member 50 (see FIG. 2), and the plate member 50 is positioned in a covered space S (see FIG. 2) which is under the seat 17 with the top being covered. In addition, the electric vehicle 10 is provided with a configuration in which the plate member 50 is drawably guided from a position inside the covered space S to a position outside the covered space S by a guide 75 (see FIG. 3) supported by the body frame 16.

Figure 10:
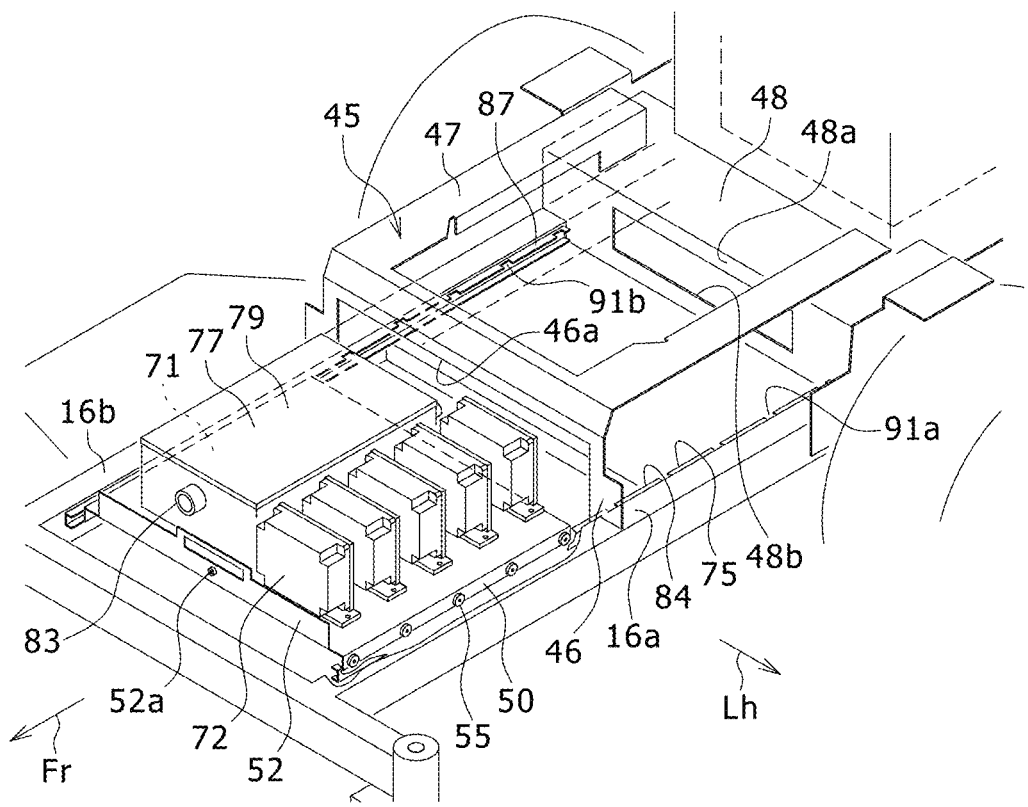
FIG. 10 is a front side enlarged diagram of the electric vehicle in FIG. 7 with the seat being removed.

Specifically, the electric vehicle 10 has a seat frame 45 to fix the seat 17 to the body frame 16 so as to bridge over the left and right main frames 16a, 16b along the front-and-rear direction. As shown in FIG. 10 referred to below, the seat frame 45 has a vertically extending inverted U-shaped front end plate 46 with an opening 46a on the inside and a U-shaped top plate 47 horizontally extending to the rear side, and an upper end of the front end plate 46 is coupled to a front end of the top plate 47. The top plate 47 is fixed to the body frame 16 either directly or via a support base 48 described below, which is provided under the seat 17. The seat 17 is fixed on the top plate 47 so as to block a U-shaped inner opening of the top plate. The U-shaped inner opening of the top plate 47 is not necessarily provided. In this state, the covered space S with the top being covered (see FIG. 2 and FIG. 3) is formed under the seat 17. In addition, as shown in FIG. 1B, the front end plate 46 is provided with a lid 49 which can be opened and closed with hinges at the top end to block the opening 46a. A lid knob 49a is provided on the front side of the lid 49. This allows a worker who performs repairs or maintenance to easily open the lid 49 by gripping the lid knob 49a with his/her fingers.

Figure 8:
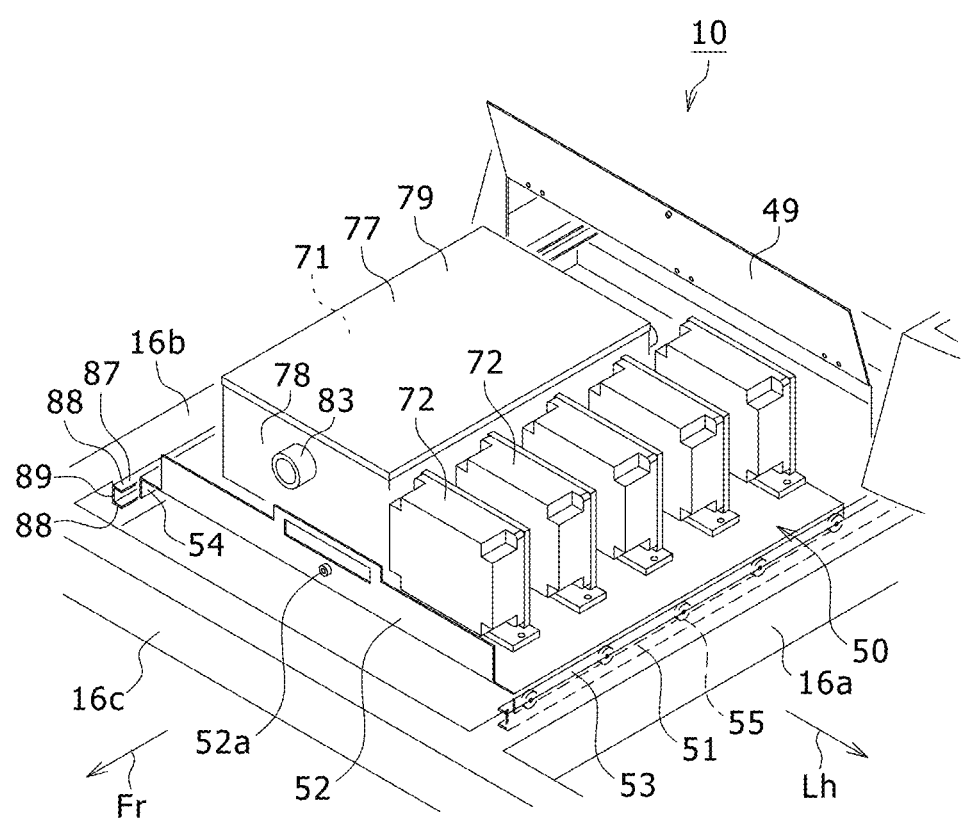
FIG. 8 is a partially enlarged diagram illustrating an area D of FIG. 7.
Figure 9:
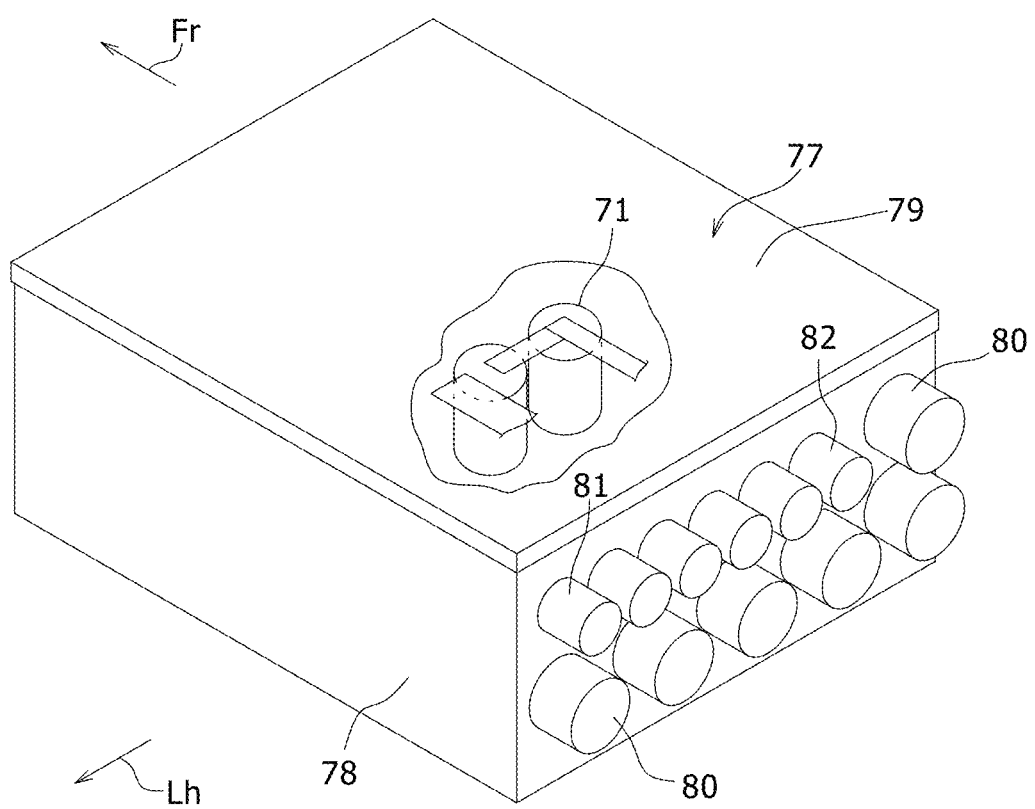
FIG. 9 is a perspective view of an electrical component case shown in FIG. 8 viewed from the rear with a portion of the top cover being transparent.

The plate member 50 with a flat plate-shaped body plate 51, which is shown in detail in FIG. 8 referred to below, is disposed inside the covered space S. The plurality of electrical components 71 and inverters 72 are detachably mounted on a top surface of the body plate 51. The plurality of inverters 72 are waterproof and dustproof due to their own cases, and are arranged side by side along the front-and-rear direction at one side of the body plate 51 in the right-and-left direction. An electrical component case 77 consists of a square-frame case body 78 which can surround an outer periphery of all the electrical components 71, and a top cover 79. A bottom peripheral edge of the case body 78 is fixed to the top surface of the body plate 51 on the other side in the right-and-left direction, and the top opening thereof is detachably blocked with the plate-shaped top cover 79 to form the electrical component case 77. The plurality of electrical components 71 (see FIG. 9), such as fuses, bus bars, contactors, are detachably arranged inside the electrical component case 77. FIG. 9 shows a portion of the electrical components 71. This allows the electrical components 71 to be protected from splashing rainwater if rainwater should enter into the covered space S. By removing the top cover 79 after drawing out the plate member 50, it is possible to access the electrical components 71 inside the case body 78. In addition, since the inverters 72 and electrical components 71 located inside the covered space S are less apt to be seen from the outside, the vehicle can be improved in appearance when in use.

The plurality of batteries 41 are located at the rear side of the plate member 50. The plate member 50 is configured to be drawable in front of the battery 41, and is drawably guided from a position inside the covered space S to a position outside the covered space S by the guide 75 (see FIG. 3) described below. This improves the workability of repairs and maintenance on the inverters 72 and electrical components 71 as described below.

As shown in FIG. 3, a plurality of connectors 80, 81, 82 are provided at the rear end of the electrical component case 77 with each protruding from a surface of the rear end. The plurality of connectors 80, 81, 82 include first connectors 80 which are connected to the three batteries 41 via a first electric wire T1 (see FIG. 2). The first electric wire T1 passes through the inside of the battery cover 42 and the inside of the support base 48 fixed on the front side of the battery cover 42, and leads to the side of the electrical component case 77 through an opening 48b (see FIG. 10) formed in a front end plate 48a (see FIG. 10) provided at the front end of the support base 48 to be connected to the first connector 80. This allows the first connector 80 to be connected to the battery 41 via the first electric wire T1. The first connector 80 is connected to the electrical component 71 inside the electrical component case 77. This makes it possible to shorten a length of the first electric wire T1 to connect the battery 41 and the electrical components 71, and facilitates arrangement of the first electric wire T1. This reduces the cost of the first electric wire T1, and lowers the noise and electrical resistance between the battery 41 and the electrical component 71.

Furthermore, the plurality of connectors 80, 81, 82 include a plurality of second connectors 81 connected to the plurality of electric motors 70 via the inverters 72 and a second wire (not shown), and a plurality of third connectors 82 connected to the controller via a third wire (not shown). The controller is installed in a space whose top is covered, such as the covered space S or the like, and is connected to a contactor inside the electrical component case 77 via the third connector 82 to control on/off of the contactor.

As shown in FIG. 10 referred below, a charging port 83 is provided on a front end surface and protrudes from the front end surface, which is a front side surface of the electrical component case 77 in the drawing-out direction of the electrical component case 77. The charging port 83 is provided to connect with a charger (not shown) connected to a commercial AC power supply as an external power source, via a charging cable (not shown). The charging port 83 is connected to the contactor and the bus bar inside the electrical component case 77, and then connected to the first connector 80 which is connected to the battery 41. A control of on-and-off switching of a plurality of contactors by the controller enables switching between charging the battery 41 with the commercial AC power source and transmitting electric power from the battery 41 to the electric motor 70. This allows the charging port 83 to be accessed by simply opening the lid 49 to the front side without drawing the plate member 50 out of the covered space S as described below, and allows the charging cable connected to the commercial AC power source to be connected to the charging port 83 and to charge the battery 41 via the electrical components 71.

Furthermore, the plate member 50 has a front end plate 52 bent upward at the front end of the body plate 51. When drawing the plate member 50 out of the covered space S, an operator can easily draw it out by gripping the front end plate 52 with his/her fingers. A nut 52a is fixed to a front surface of the front end plate 52 at a position where the nut faces the lid knob 49a when the lid 49 is closed. A shaft of the lid knob 49a is provided with a rear end having a threaded portion, which projects from a rear surface of the lid 49 to the rear side. By screwing it into the nut 52a, a closed state of the lid 49 is maintained while the plate member 50 is held immovably in the covered space S.

Next, the configuration of the plate member 50 for drawably guiding the plate member 50 and the guide 75 is described below. As shown in FIG. 8 referred to below, the plate member 50 has left and right end plates 53, 54 which are bent downwardly at left and right ends of the body plate 51, respectively. As shown in FIG. 4, the left end plate 53 has a plurality of shafts, which protrude from a plurality of side positions of the left end plate 53 in the front-and-rear direction to the outside in the left direction, and first rollers 55 are rotatably supported on the shafts, respectively. Similar to the left end plate 53, the right end plate 54 has a plurality of shafts, which protrude from a plurality of side positions of the right end plate 54 in the front-and-rear direction to the outside in the right direction, and second rollers 56 (see FIG. 3) are rotatably supported on the shafts, respectively. As a result, the plate member 50 includes the first rollers 55 and the second rollers 56 which are rotatably provided on both end portions in a direction orthogonal to the drawing-out direction.

On the other hand, on each of the facing inner surfaces of the left and right main frames 16a and 16b of the body frame 16 in a vehicle-wide direction, the guide 75 is supported and fixed to drawably guide the plate member 50 from a position inside the covered space S to a position outside the covered space S, which is in front of the covered space S.

Specifically, the guide 75 has a left first guide 84 (see FIG. 6) to guide the movement of the plurality of first rollers 55 and a right second guide 87 (see FIG. 6) to guide the movement of the plurality of second rollers 56. The first guide 84 extends long in the drawing-out direction of the front side, and is a rail having a horizontally U-shaped cross section as shown in FIG. 4. The first guide has two first plates 85 at positions sandwiching the plurality of first rollers 55, which are divided vertically and parallel with each other, and a first coupler 86 to couple left ends of the two first plates 85. The second guide 87 extends long in the drawing-out direction of the front side. The second guide has two second plates 88 (see FIG. 8) at positions sandwiching the plurality of second rollers 56, which are divided vertically and parallel with each other, and a second coupler 89 (see FIG. 8) to couple right ends of the two second plates 88. The first guide 84 has the first coupler 86 fixed to the inner surface of the left main frame 16a, and the first rollers 55 run on the lower first plate 85. The second guide 87 has the second coupler 89 fixed to the inner surface of the right main frame 16b, and the second rollers 56 run on the lower second plate 88. This allows the plate member 50 to be easily drawn out from the position inside the covered space S with light force without running off, thereby further improving workability when performing repair and maintenance work as described below.

As shown in FIG. 10 referred to below, rectangular recesses 91a, 91b are formed at a plurality of positions in a longitudinal direction of the upper first and second plate members 85, 88, where a portion of the guides 84, 87 are positioned inside the covered space S. This allows the plate member 50 to be assembled to the guide 75 so that the rollers 55, 56 can be arranged inside the guides 84, 87 from above in FIG. 10 while preventing the rollers 55, 56 attached to the left and right ends of the plate member 50 from interfering with the guides 84, 87.

As shown in FIG. 6 referred to below, the guides 84, 87 extend to near the front ends of the main frames 16a, 16b, respectively. A floor cover 90 is assembled to the front side of the electric vehicle 10 to place on the two main frames 16a, 16b and the lateral frame 16c at the front side so that the front portions of guides 84, 87 are invisible from the outside. The floor cover 90 can be made of resin to reduce its weight. This enables the operator to easily remove the floor cover 90 as described below.

Figure 5:
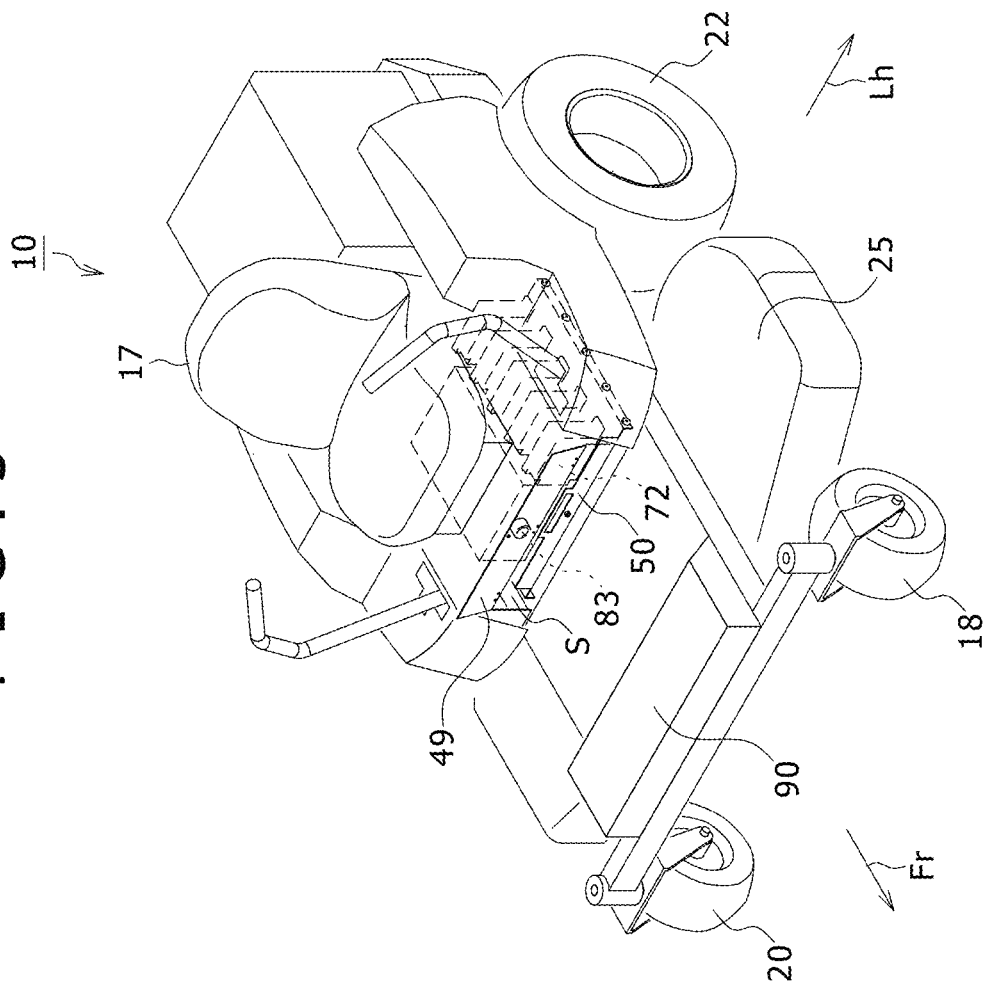
FIG. 5 is a perspective view of the electric vehicle in FIG. 1A with a lid being opened.

Next, with reference to FIG. 5 through FIG. 10, a method of drawing the plate member out of the covered space S to perform the repair or maintenance of the inverters 72 and electrical components 71 is described below. FIG. 5 is a perspective view of the electric vehicle 10 with the lid 49 being opened. First, during the repair or maintenance, the operator can grip the lid knob 49a (see FIG. 1B) and open the lid 49 upwardly as shown in FIG. 5.

FIG. 6 is a perspective view of the electric vehicle with the floor cover 90 being removed in the state shown in FIG. 5. The operator can remove the floor cover 90 in the state shown in FIG. 5 to expose the front portions of the guides 84, 87 to the outside.

Figure 7:
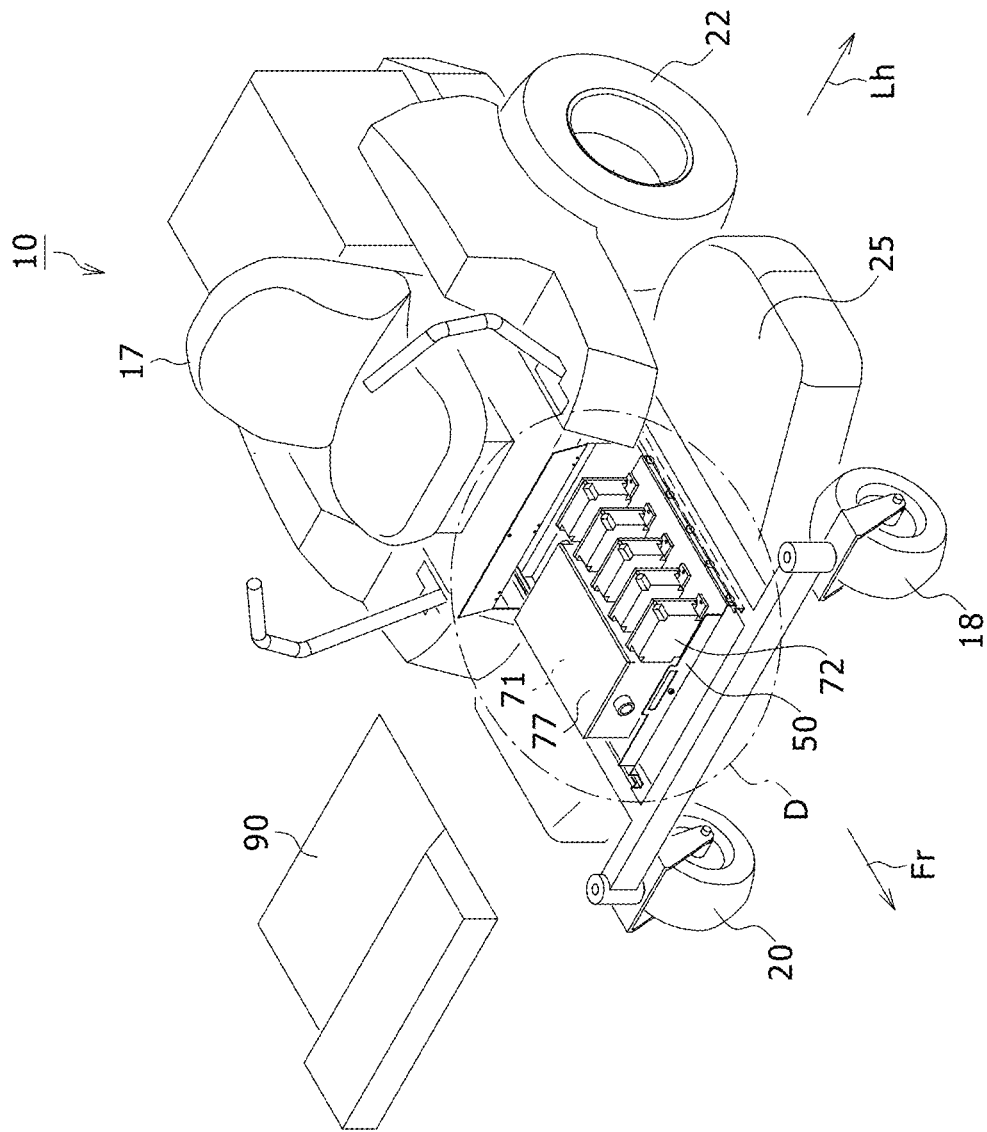
FIG. 7 is a perspective view of the electric vehicle with a plate member being drawn out in FIG. 6.

FIG. 7 is a perspective view of the electric vehicle with the plate member 50 being drawn out in the state shown in FIG. 6. FIG. 8 is a partially enlarged diagram illustrating an area D of FIG. 7. FIG. 9 is a perspective view of the electrical component case 77 as viewed from the rear side with a portion of the top cover 79 being transparent. FIG. 10 is a front side enlarged diagram of the electric vehicle with the seat 17 being removed in the state shown in FIG. 7. After the state shown in FIG. 6, the operator can draw the plate member 50 out of the position inside the covered space S to the position in front of the covered space S while rolling the rollers 55, 56 on the guides 84, 87 to expose the electrical component case 77 and the plurality of inverters 72 to a large space outside the covered space. Thus, the operator can perform the repair or maintenance of the electrical components 71 and the inverters 72 in the large space. When inspecting and repairing the electrical components 71, it is only necessary to remove the top cover 79 of the electrical component case 77 with the electrical components 71 and inverters 72 being mounted on the vehicle.

According to the electric vehicle 10 described above, by placing the inverters 72 and the electrical components 71 inside the covered space S whose top is covered in a normal operation condition, it is possible to protect the electrical components 71 and the inverters 72 from splashing rainwater, and to improve the appearance when in use because the inverters 72 and the electrical components 71 are less apt to be seen from outside. Furthermore, when performing the repair or maintenance, since the plate member 50 to which the inverters 72 and electrical components 71 are attached can be drawn out into a large space outside the covered space S, the workability of the repair and maintenance is improved. Furthermore, when performing the repair or maintenance, differing from a configuration disclosed in JP 2018-184035 A, in which a box containing the inverters and electrical components is detachably provided under the seat on the vehicle body, it is not necessary to remove the seat 17 from its mounted position on the electric vehicle 10. This greatly facilitates the workability of the repair and maintenance. As a result, it is possible to protect the inverters 72 and electrical components 71 from splashing rainwater, improve the appearance of the electric vehicle when in use, and improve the workability of repair and maintenance.

Furthermore, since a space under the seat 17 can be used effectively by placing the plate member 50 inside the covered space S under the seat 17, it is possible to eliminate or reduce parts dedicated to protecting the inverters 72 and electrical components 71 from splashing rainwater.

Furthermore, the electrical components 71 are placed inside the electrical component case 77, and the electrical component case 77 has the charging port 83 on the front side surface in the drawing-out direction, and the electrical components 71 are connected to the battery 41. As a result, by the charging port 83 being connected to the electrical components 71 inside the electrical component case 77, the charging cable connected to the commercial AC power source can be connected to the charging port 83 to charge the battery 41 via the electrical components 71 without drawing out the plate member 50 from the covered space S with only the lid 49 being opened, as shown in FIG. 5, for example.

In the above mentioned embodiment, an example, in which the guides 84, 87 have a horizontally U-shaped cross section to guide the movement of the rollers, has been described, but the configuration of the guides is not limited thereto. For example, it may be the case that no rollers are placed in the guides 84, 87, and left and right ends of the plate member 50 are directly inserted into the guides 84, 87 to slide thereon in the longitudinal direction. At this time, either or both of guides 84, 87 and the plate member 50 may be made of resin to slide more easily. Since the guides 84, 87 limit the direction of movement of the plate member 50 only to the longitudinal direction of the guide elements 84, 87, a vertical movement transmitted to the plate member 50 from the ground during traveling is received with the guides 84, 87, so that flapping of the plate member in the covered space S can be suppressed. In addition, the guides may be anything capable of guiding the movement of the plate member 50. For example, the guides may be configured to be a long guide element disposed along the front-and-rear direction at the center of the right-and-left direction of the vehicle with a groove being opened toward the plate member 50. The plate member 50 may be configured to have a protruding part formed on the surface facing the groove along the longitudinal direction so that the protruding part can be slidably inserted into the groove.

First Alternative Example of the Embodiment

Figure 11:
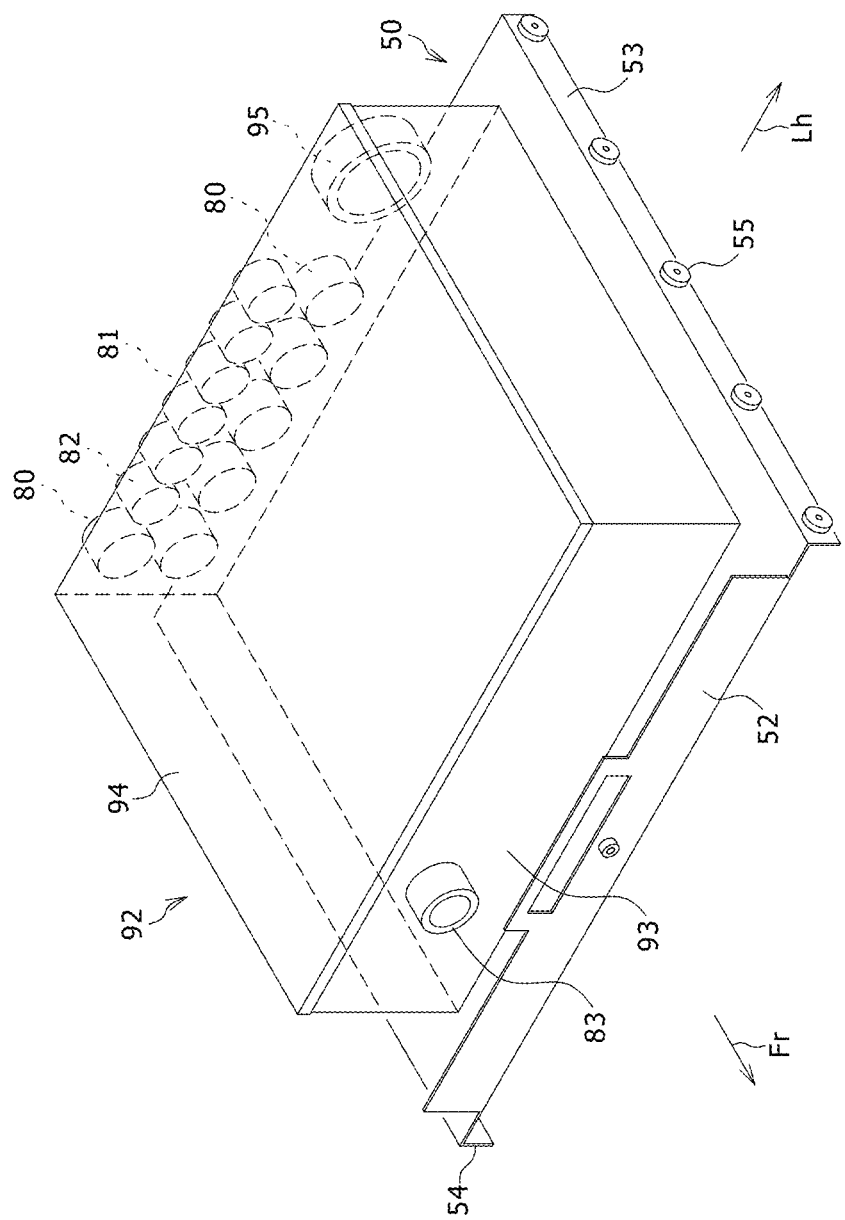
FIG. 11 is a perspective view illustrating a plate member and a unit case to be mounted on an electric vehicle according to alternative example of the embodiment of the present disclosure.

FIG. 11 is a perspective view illustrating the plate member 50 and a unit case 92 to be mounted on the electric vehicle according to an alternative example of the embodiment. In a configuration of this example, while the plurality of inverters 72 (see FIG. 8) and electrical components 71 (see FIG. 9) are detachably mounted on the top surface of the plate member 50, all of them are enclosed in a common unit case 92. The unit case 92 is formed by removably closing with a plate member-shaped top cover 94 a top end opening of a substantially rectangular frame-shaped case body 93 whose top end is opened. A bottom end periphery of the case body 93 is fixed to the top surface of the plate member 50. The plurality of connectors 80, 81, 82 are provided, with each protruding from the rear end of the unit case 92. The charging port 83 is provided at the front end of the unit case 92. A port 95, through which a bundled plurality of wires that connect the plurality of inverters 72 inside the unit case 92 to the outside electric motors pass, is provided at the rear end of the unit case 92.

According to the configuration of this example, not only the electrical components 71 but also the inverters 72 are covered by the unit case 92, so that waterproof and dustproof characteristics of the inverters 72 and the electrical components 71 can be improved. The other configurations and actions of this example are the same as those of the embodiment shown in FIG. 1 through FIG. 10.

Second Alternative Example of the Embodiment

Figure 12:
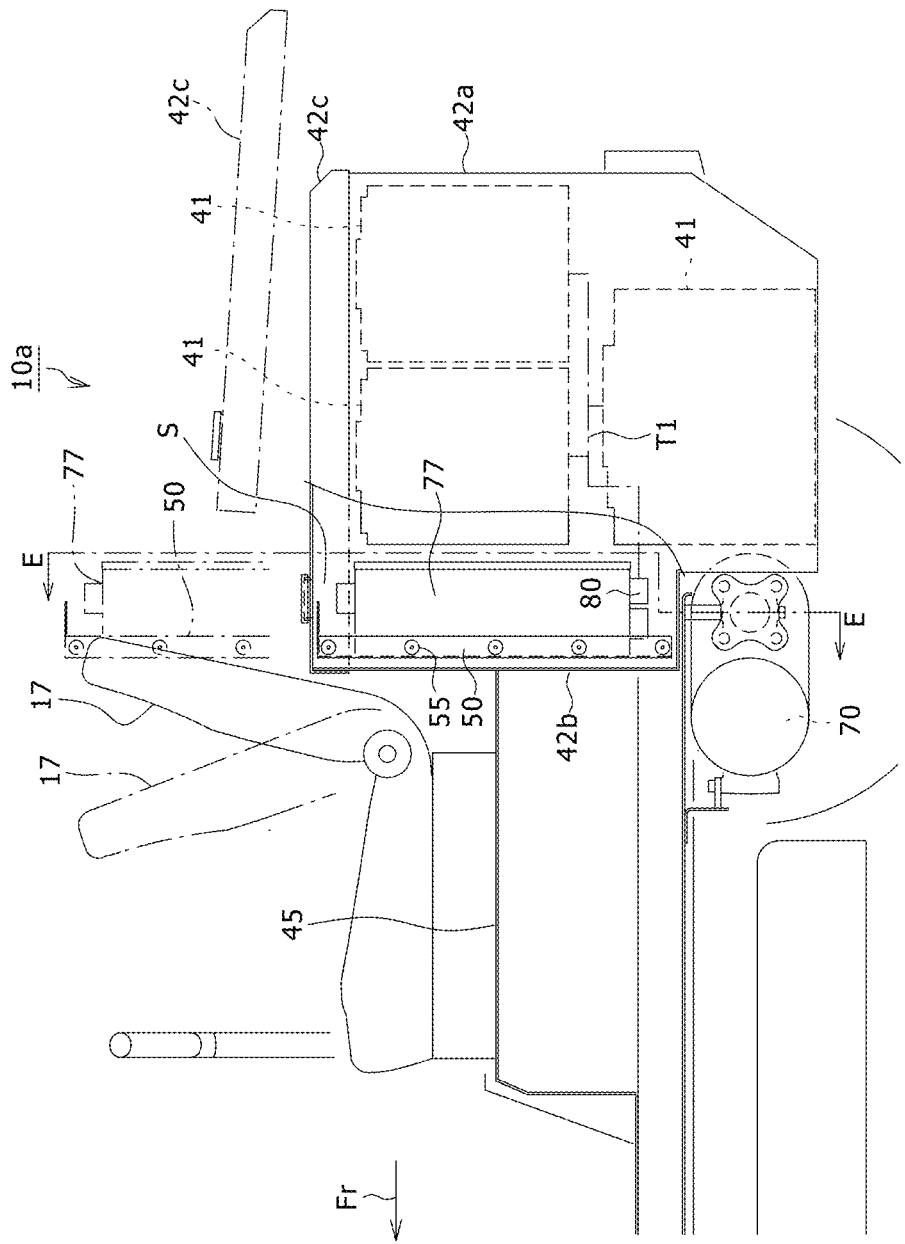
FIG. 12 is a side view of a rear portion of the electric vehicle according to alternative example of the embodiment of the present disclosure in which a portion thereof is illustrated as a cross sectional view.
Figure 13:
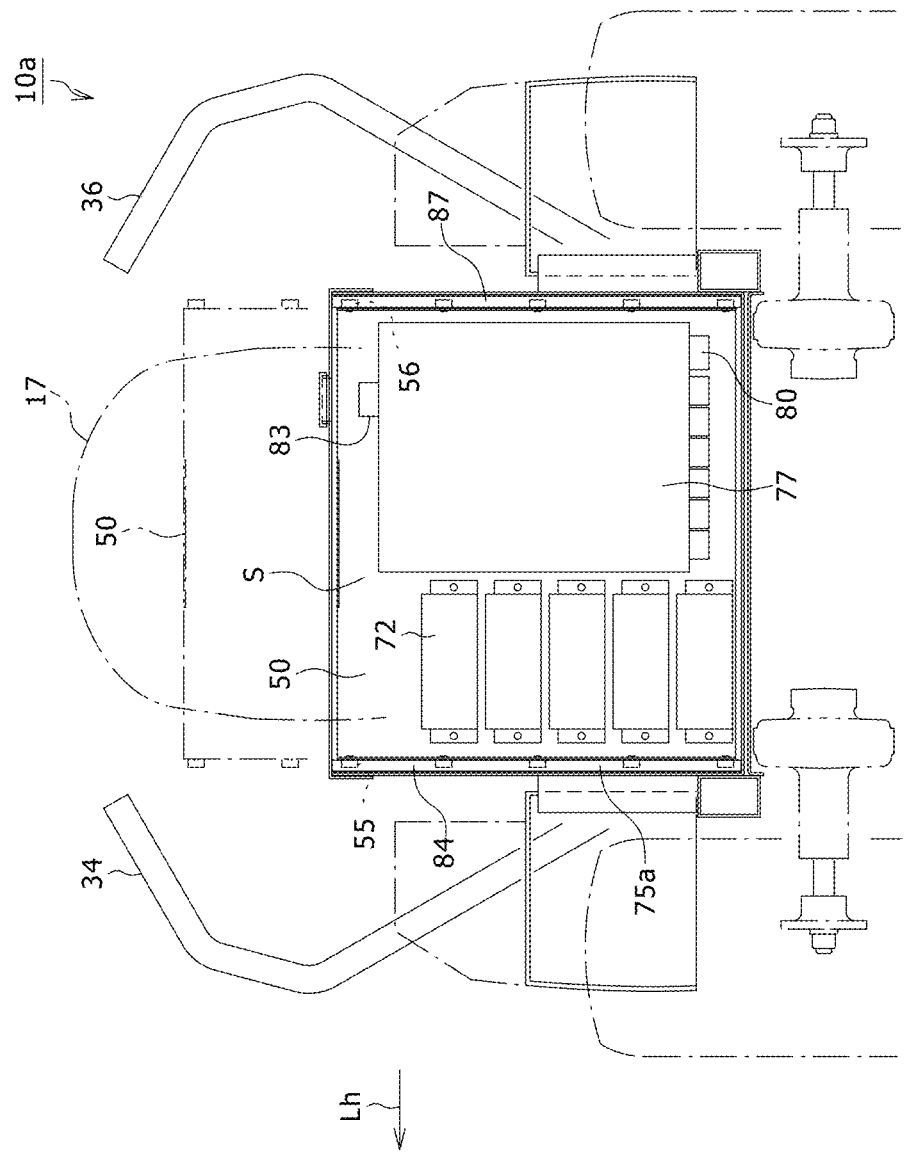
FIG. 13 is a cross sectional view taken along line E-E of FIG. 12.

FIG. 12 is a side view of a rear portion of the electric vehicle 10 according to alternative example of the embodiment in which a portion thereof is illustrated as a cross sectional view. FIG. 13 is a cross sectional view taken along line E-E of FIG. 12. In a configuration of this example, the support base is removed from the inside of the seat frame 45, and a length of the seat frame 45 in the front-and-rear direction is shortened. In addition, an extension part 42b extending in the front side is provided on the front upper side of a battery cover 42a. The plate member 50 is placed in front of the plurality of batteries 41 inside the battery cover 42a and inside the extension part 42b so that it can be drawn out from the top end of the battery cover 42a to an upside from the vehicle body. This allows the plate member 50 to be positioned between the battery 41 and the seat 17 and to be drawn out to the upside from the vehicle body. Furthermore, the plurality of electrical components 71 (see FIG. 9) and the plurality of inverters 72 are detachably mounted on the rear side of the plate member 50. The top, bottom, left, right, and rear sides of the electrical components 71 are covered with the electrical component case 77 in a manner similar to the embodiment of FIG. 8 mentioned above. All of the electrical components 71 and the plurality of inverters 72 may be covered and enclosed by the unit case in a manner similar to the embodiment of FIG. 11 mentioned above.

The plurality of first rollers 55 and second rollers 56 are rotatably attached to the left and right end surfaces of the plate member 50, respectively. The plate member 50 itself has the same configuration as the plate member illustrated in FIG. 1 through FIG. 10, except that the orientation of the plate member 50 is changed from the front-and-rear direction to the vertical direction. Furthermore, the first guide 84 and the second guide 87, which constitute the guide 75a, are fixed to the left and right inner end surfaces of the extension part 42b of the battery cover 42a so as to extend in the vertical direction, respectively. Each of the guides 84, 87 itself has the same configuration as the corresponding guide illustrated in FIG. 1 through FIG. 10, except that the orientation of each of the guides 84, 87 is changed from the front-and-rear direction to the vertical direction. The movement of the plurality of first rollers 55 is guided upwardly with the first guide 84, and the movement of the plurality of second rollers 56 is guided upwardly with the second guide 87 in the drawing-out direction. The top end opening of the battery cover 42a including the extension part 42b is removably closed by the top cover 42c to prevent invasion of rainwater and dust and to protect the electrical components 71, the plurality of inverters 72, and the batteries 41. The covered space S is formed inside the extension part 42b of the battery cover 42a. A backrest of the seat 17 can be pivoted toward the front side.

When performing repair or maintenance, as shown by the single dotted line in FIG. 12, the backrest of the seat 17 is tilted and retreated forward from an upper side of the battery cover 42a in a state of removing of the top cover 42c from the top of the battery cover 42a. In this state, the plate member 50 is drawn out upwardly while being guided with the guide 75a to expose the electrical component case 77 and the inverters 72 outside the battery cover 42a. Thus, the operator can perform the repair or maintenance of the electrical components 71 and the inverters 72 in the large space. The battery cover 42a has hooks or stopper pins (not shown) which can temporarily engage with the plate member 50 in order to hold the plate member 50 at an upwardly drawn out position and at an accommodated position at which the plate member 50 is accommodated inside the battery cover 42a. For example, by forming apertures on the plate member 50 at positions separated in the vertical direction, and protruding the stopper pin from the side of the battery cover 42a by spring force to engage with any one of the holes, it is possible to hold the plate member 50 to the battery cover 42a at the upwardly drawn out position and the accommodated position. As a result, even when vibrations are transmitted from the ground to the plate member 50 at the accommodated position of the plate member 50 while traveling, flapping of the plate member 50 inside the covered space S can be effectively suppressed.

According to the configuration of this example, while a space on the rear side of the seat 17 and in front of the battery 41 can be used effectively, the electric wire T1 connecting the connectors 80 to the battery 41 can be shortened by placing the connectors 80 to connect the electrical components 71 to the battery 41 in the vicinity of the bottom end of the plate member 50. This reduces the cost of the electric wire T1, and decreases the noise and electrical resistance between the battery 41 and the electrical components 71. The other configurations and actions of this example are the same as those of the embodiment shown in FIG. 1 through FIG. 10.

Third Alternative Example of the Embodiment

Figure 14:
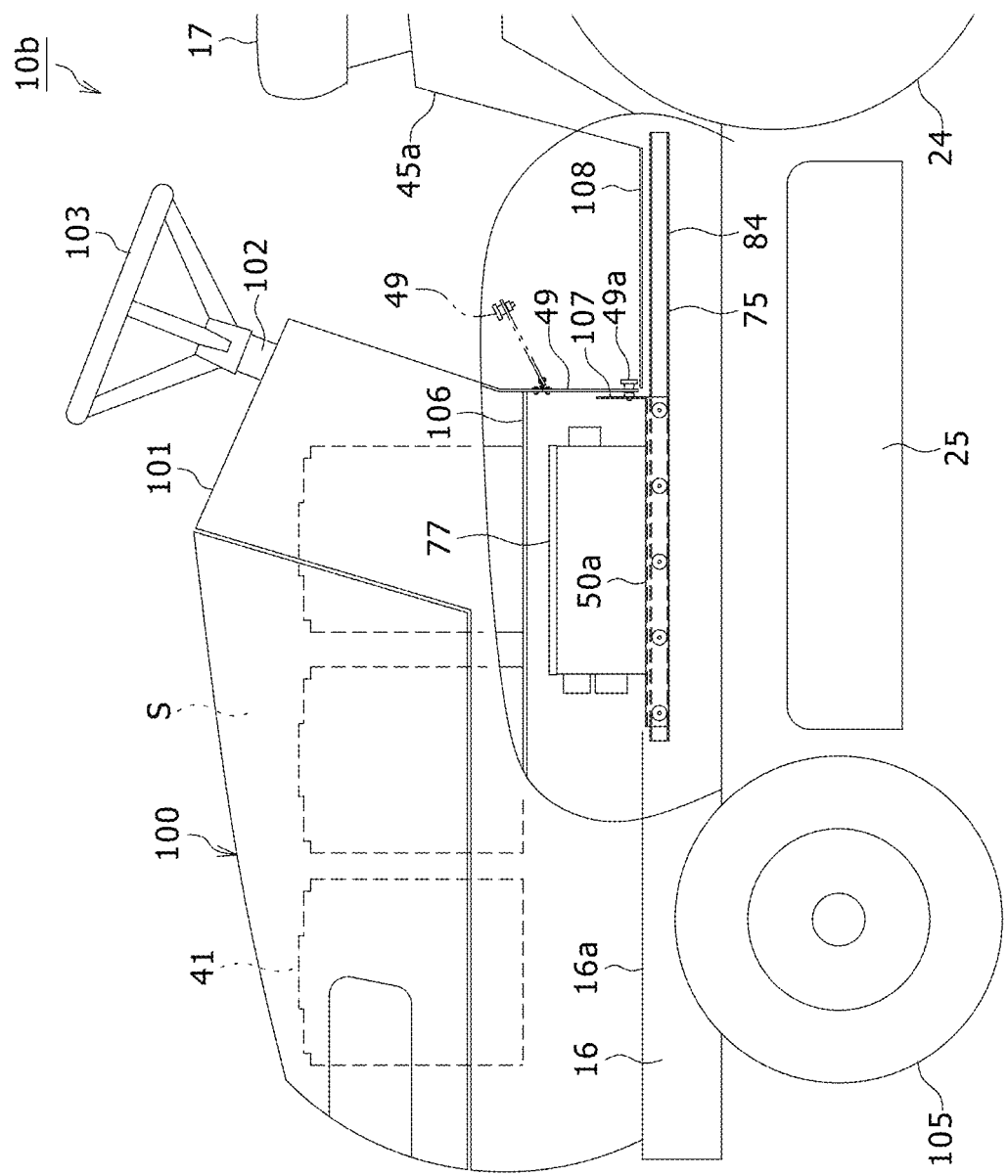
FIG. 14 is a side view of a front portion of an electric vehicle according to alternative example of the embodiment of the present disclosure in which a portion thereof is illustrated as a cross sectional view.

FIG. 14 is a side view of a front portion of the electric vehicle 10 according to alternative example of the embodiment in which a portion thereof is illustrated as a cross sectional view. In a configuration of this example, a hood 100 is fixed to the body frame 16 in front of the seat 17. The covered space S, whose top is covered with the hood 100, is provided under the hood 100. The hood 100 has a box-like shape with its bottom end being opened. At a rear end of a top plate 101 provided on the top end of the hood 100, a steering operation shaft 102 penetrates through the top plate upward obliquely. A steering wheel 103 is attached to a top end of the steering operation shaft 102. A gear mechanism, which is connected to a steering mechanism (not shown) to steer left and right front wheels 105, is connected at the bottom end of the steering operation shaft 102. The orientation of the front two wheels 105 is changed by rotating the steering wheel 103. In addition, a motor (not shown) is fixed to the rear side of the body frame 16, and driving power of an output shaft of the motor is transmitted to the rear two wheels 24 via an axle drive unit (not shown) having a differential mechanism.

A partition plate 106 is horizontally fixed inside the hood 100 at the middle part in the vertical direction. One or more batteries 41 are mounted on the partition plate 106. This allows the batteries 41 to be placed in front of the seat with being covered by the hood 100. A plate member 50a drawable to the rear side, which is one side in the front-and-rear direction, is placed below the partition plate 106. As a result, the plate member 50a is placed inside the covered space S under the hood 100. On the plate member 50a, the electrical component case 77 containing electrical components and a plurality of inverters are fixed side by side along the right-and-left direction of the vehicle.

Furthermore, the left side first guide 84 forming the guide 75 and the right side second guide 87 (see FIG. 10) are supported and fixed on the inner side faces of the left and right main frames 16a, 16b in a vehicle-wide direction, respectively. Each of the guides 84, 87 is formed by coupling along the front-and-rear direction a portion inside the covered space S and a portion located on the rear side of the covered space S. The guide 75 drawably guides the plate member 50 from a position inside the covered space S to a position outside of and on the rear side of the covered space S. This allows the plate member 50 to be placed in the covered space S and to be drawn out from the inside of the covered space S to the rear side thereof, which is one side in the front-and-rear direction. The configuration of the guide 75 of this example is the same as that of the guide 75 of the embodiment shown in FIG. 1 through FIG. 10.

In addition, the lid 49, which can be opened and closed, is provided at the lower side of the rear end of the hood 100. At the rear end of the plate member 50a, a rear end plate 107 is formed so as to rise up vertically. The nut 52a is fixed to a rear side surface of the rear end plate 107, so that the nut 52a faces the lid knob 49a when the lid 49 is closed. A shaft of the lid knob 49a is provided with a front end having a threaded portion, which projects from a front side surface of the lid 49 to the front side. By screwing it into the nut 52a, a closed state of the lid 49 is maintained while the plate member 50a is held immovably in the covered space S.

The floor plate 108 is assembled to the main frame 16a or a member fixed to the main frame 16a at a portion of each of guides 84, 87 located between the hood 100 and a seat frame 45a to which the seat 17 is fixed. This makes the guides 84, 87 are less apt to be seen from the outside in a normal operation condition.

When performing repair or maintenance of the inverters and electrical components, the operator may draw out the plate member 50a from a position in the covered space S to a position on the rear side of the covered space S along each of the guides 84, 87 after removing the floor plate 108 from the vehicle. This allows the electrical component case 77 and the plurality of inverters to be exposed to a large outside space. Thus, the operator can perform the repair or maintenance of the electrical components and the inverters in the large space.

Furthermore, in the configuration of this example, it is possible to share the parts with a vehicle with an engine by providing the battery 41 in place of the engine in the vehicle with the engine which is located inside the hood 100 as a driving source of the vehicle. Furthermore, an extra space inside the hood 100 can be used as a space to accommodate the inverters and the electrical component case 77 in which the electrical components are enclosed. In the configuration of this example, while the lid, which can be opened and closed, is provided on the lower side of a front end plate of the hood, the plate member to which the inverters and electrical component case are fixed may be drawn out to a front side of the hood 100 by the guides with the lid being opened. In this case, one side in the front-and-rear direction designates the front side. The other configurations and actions of this example are the same as those of the embodiment shown in FIG. 1 through FIG. 10.

At least one embodiment mentioned above has the configuration of the electric vehicle of the present disclosure. Thus, by placing the inverters and the electrical components inside the covered space whose top is covered in a normal operation condition, it is possible to protect the electrical components and the inverters from splashing rainwater, as well as improve the appearance when in use because the inverters and the electrical components are less apt to be seen from outside. Furthermore, when performing repair or maintenance, since the plate member to which the inverters and electrical components are attached can be drawn out into a large space outside the covered space, workability of the repair and maintenance is improved. Furthermore, when performing the repair or maintenance, differing from a configuration disclosed in JP 2018-184035 A, in which a box containing the inverters and electrical components is detachably provided at a fixed position set under the seat on the vehicle body, it is not necessary to separate the seat from its mounted position on the electric vehicle and to temporarily remove the heavy storage box from the vehicle at the time of maintenance of electrical components, and the like. This further improves the workability of the repair and maintenance.

As a result, it is possible to protect the inverters and electrical components from splashing rainwater, improve the appearance of the electric vehicle when in use, and improve the workability of the repair and maintenance.

In the electric vehicle of the present disclosure, the plate member may be placed in the covered space under the seat to be drawn out to one side along a front-and-rear direction of the vehicle. According to the configuration mentioned above, while the space under the seat can be used effectively, it is possible to eliminate or reduce parts dedicated to protecting the inverters and electrical components from splashing rainwater.

In the electric vehicle of the present disclosure, the electrical components may be placed inside the electrical component case, the electrical component case may have the charging port on the front side surface in the drawing-out direction, and the electrical components may be connected to the battery. According to the configuration mentioned above, since the charging port is connected to the electrical components inside the electrical component case, the charging cable connected to an external power source can be connected to the charging port to charge the battery via the electrical components without drawing out the plate member from the covered space.

The electric vehicle of the present disclosure may be configured so that: the battery is disposed on the rear side of the plate member; the plate member is drawable in front of the battery; the electrical components are disposed in the electrical component case; the electrical component case is provided with a connector connected to the electrical components at the rear end; and the connector is connected to the battery with an electric wire. This configuration enables shortening of a length of the electric wire to connect the battery and the electrical components, and facilitates arrangement of the same. This reduces the cost of the electric wire, and decreases the noise and electrical resistance between the battery and the electrical components.

The electric vehicle of the present disclosure may be configured so that the inverters and the electrical components are disposed in a common case and the case is mounted on the plate member. According to the configuration mentioned above, waterproof and dustproof characteristics of the inverters and the electrical components can be improved.

The electric vehicle of the present disclosure may be configured so that: the battery is disposed on the rear side of the seat; and the plate member is located between the battery and the seat and be operable to be drawn out above the vehicle. According to the configuration mentioned above, while a space on the rear side of the seat and in front of the battery can be used effectively, the electric wire connecting the connectors and the battery can be shortened by placing the connectors to connect the electrical components to the battery in the vicinity of the plate member. This reduces the cost of the electric wire, and decreases the noise and electrical resistance between the battery and the electrical components.

The electric vehicle of the present disclosure may be configured so that: the plate member has a first roller and a second roller which are rotatably attached to both end portions in a direction orthogonal to a drawing-out direction, the guide includes a first guide extending long in the drawing-out direction, which has two first plates provided in parallel with each other to sandwich the first roller and a first coupler to couple the two first plates, and a second guide extending long in the drawing-out direction, which has two second plates provided in parallel with each other to sandwich the second roller and a second coupler to couple the two second plates. The above mentioned configuration allows the plate member to be easily drawn out from the position inside the covered space, thereby further improving the workability of repair and maintenance.

The electric vehicle of the present disclosure may be configured so that: the battery is disposed in front of the seat covered by the hood; and the plate member is located inside the covered space under the hood to be drawn out to one side in the front-and-rear direction. According to the above configuration, when the battery is installed in place of the engine in the vehicle in which the engine is mounted in the hood as a driving source for the wheels, an extra space inside the hood can be used as a space to accommodate the inverters and the electrical components.

What is claimed is:

1. An electric vehicle comprising:
    a body frame;
    a seat disposed on the body frame;
    a wheel attached to the body frame to be driven by an electric motor;
    a battery to supply electric power to the electric motor via an inverter and an electrical component;
    a plate member placed inside a covered space with a top being covered and on which the inverter and the electrical component are mounted; and
    a guide supported by the body frame to drawably guide the plate member from a position inside the covered space to a space, which is exposed to an outside, between a front end of the body frame and the seat in a front-and-rear direction, and which is at a position outside the covered space.

2. The electric vehicle according to claim 1, wherein
the plate member is placed inside the covered space under the seat to be drawn out to a front side along the front-and-rear direction of the vehicle.

3. The electric vehicle according to claim 1, wherein
the electrical component is placed inside an electrical component case, the electrical component case has a charging port on a front side surface in a drawing-out direction, and the electrical component is connected to the battery.

4. The electric vehicle according to claim 1, wherein
the battery is disposed on a rear side than the plate member;
the plate member is drawn in front of the battery;
the electrical component is placed inside an electrical component case;
the electrical component case has a connector connected to the electrical component on a rear end; and
the connector is connected to the battery via an electric wire.

5. The electric vehicle according to claim 1, wherein
the inverter and the electrical component are disposed in a common case and the case is mounted on the plate member.

6. An electric vehicle comprising:
a body frame;
a seat disposed on the body frame;
a wheel attached to the body frame to be driven by an electric motor;
a battery to supply electric power to the electric motor via an inverter and an electrical component;
a plate member placed inside a covered space with a top being covered and on which the inverter and the electrical component are mounted; and
a guide supported by the body frame to drawably guide the plate member from a position inside the covered space to a position outside the covered space, wherein
the battery is disposed on a rear side of the seat;
the plate member is located between the battery and the seat; and
the plate member is operable to be drawn toward an upper side of the vehicle.

7. An electric vehicle comprising:
a body frame;
a seat disposed on the body frame;
a wheel attached to the body frame to be driven by an electric motor;
a battery to supply electric power to the electric motor via an inverter and an electrical component;
a plate member placed inside a covered space with a top being covered and on which the inverter and the electrical component are mounted; and
a guide supported by the body frame to drawably guide the plate member from a position inside the covered space to a position outside the covered space, wherein
the plate member has a first roller and a second roller that are rotatably attached to both end portions in a direction orthogonal to a drawing-out direction,
the guide includes:
a first guide extending long in the drawing-out direction that has two first plates provided in parallel with each other to sandwich the first roller and a first coupler to couple the two first plates, and a second guide extending long in the drawing-out direction that has two second plates provided in parallel with each other to sandwich the second roller and a second coupler to couple the two second plates.

8. An electric vehicle comprising:
a body frame;
a seat disposed on the body frame;
a wheel attached to the body frame to be driven by an electric motor;
a battery to supply electric power to the electric motor via an inverter and an electrical component;
a plate member placed inside a covered space with a top being covered and on which the inverter and the electrical component are mounted; and
a guide supported by the body frame to drawably guide the plate member from a position inside the covered space to a position outside the covered space, wherein
the battery is disposed in front of the seat covered by a hood, and
the plate member is located inside the covered space under the hood to be drawn out to one side in a front-and-rear direction.

\* \* \* \* \*